US009735719B2

(12) United States Patent
Diez-Maroto et al.

(10) Patent No.: US 9,735,719 B2
(45) Date of Patent: Aug. 15, 2017

(54) STATIC EXCITER SYSTEM FOR GENERATORS

(71) Applicant: ALSTOM Technology Ltd, Baden (CH)

(72) Inventors: Luis Diez-Maroto, Madrid (ES); Luis Rouco-Rodriguez, Madrid (ES); Fidel Fernandez-Bernal, Torrejon de Ardoz (ES); Idriss El-Merdoui, Rixheim (FR)

(73) Assignee: General Electric Technology GmbH, Baden (CH)

( * ) Notice: Subject to any disclaimer, the term of this patent is extended or adjusted under 35 U.S.C. 154(b) by 52 days.

(21) Appl. No.: 14/705,409

(22) Filed: May 6, 2015

(65) Prior Publication Data

US 2015/0326160 A1    Nov. 12, 2015

(30) Foreign Application Priority Data

May 12, 2014    (EP) .................................. 14167894

(51) Int. Cl.
*H02P 9/00*    (2006.01)
*H02P 9/02*    (2006.01)
*H02J 3/08*    (2006.01)
*H02P 9/30*    (2006.01)

(52) U.S. Cl.
CPC .................. *H02P 9/02* (2013.01); *H02J 3/08* (2013.01); *H02P 9/30* (2013.01)

(58) Field of Classification Search
CPC .................. H20P 9/30; H02P 9/02; H02J 3/08
USPC .......................................... 322/7, 20, 89, 44
See application file for complete search history.

(56) References Cited

U.S. PATENT DOCUMENTS

| | | | | |
|---|---|---|---|---|
| 3,496,448 A | * | 2/1970 | Eidenvall | H02H 7/122 322/28 |
| 4,701,690 A | * | 10/1987 | Fernandez | H02P 9/30 307/64 |
| 4,743,814 A | * | 5/1988 | Sankey | H02P 7/34 318/137 |
| 8,058,753 B2 | * | 11/2011 | Achilles | F03D 7/0284 307/153 |
| 2007/0159140 A1 | * | 7/2007 | Garces | H02P 9/302 322/59 |

(Continued)

FOREIGN PATENT DOCUMENTS

CN    103577691 A    2/2014
EP    0989667 A1    3/2000
(Continued)

OTHER PUBLICATIONS

Susuki et al., "Global Swing Instability of Multi-Machine Power Systems", 47th IEEE Conference on Decision and Control, Cancun, Mexico, pp. 2487-2492, Dec. 9-11, 2008.
(Continued)

*Primary Examiner* — Julio C. Gonzalez R.
(74) *Attorney, Agent, or Firm* — Global Patent Operation; John A. Kramer

(57) ABSTRACT

The present invention relates to the field of generator technology. It is an object of the invention to control the stability in an electric grid in which a plurality of generators are connected providing electric power to the grid. A static exciter system includes a control device for controlling the field voltage of the field winding of at least two generators connected to a grid system via a busbar.

10 Claims, 4 Drawing Sheets

(56) References Cited

U.S. PATENT DOCUMENTS

| | | | | |
|---|---|---|---|---|
| 2007/0296275 A1* | 12/2007 | Joho | ........................ | H02P 9/30 |
| | | | | 307/47 |
| 2011/0050183 A1* | 3/2011 | Ginet | ........................ | H02P 9/10 |
| | | | | 322/86 |
| 2012/0175876 A1 | 7/2012 | Pendray et al. | | |

FOREIGN PATENT DOCUMENTS

| | | |
|---|---|---|
| EP | 2 182 207 A2 | 5/2010 |
| EP | 2288017 B1 | 2/2011 |
| EP | 2293432 A1 | 3/2011 |
| WO | 2006/045703 A1 | 5/2006 |
| WO | 2008/012853 A1 | 1/2008 |

OTHER PUBLICATIONS

Rouco et al., "Improvement of the Voltage Ride Through Capability of Synchronous Generators by Excitation control", Cigré, pp. 01-12, Aug. 2010.

Diezmaroto et al., "Impact of Auxiliaries Response on the Voltage Ride Through Capability of Synchronous Generator Power Plants", Cigré Colloquium on New Development of Rotating Electrical Machines, pp. 373-381, Sep. 2011.

* cited by examiner

STATIC EXCITER SYSTEM FOR GENERATORS

CROSS-REFERENCE TO RELATED APPLICATIONS

This application claims priority to European application 14167894.6 filed May 12, 2014, the contents of which are hereby incorporated in its entirety.

TECHNICAL FIELD

The present invention relates to the field of generator technology. It relates in particular to a static exciter system for controlling the field voltage of generators and to a method for controlling the field voltage of generators.

BACKGROUND

Static exciter systems for feeding the field winding creating a magnetic excitation field for a generator and thus supplying the generator excitation are widely used. These systems are determined by their robustness and a short response time. In case of grid faults it is important that generators connected to the grid, especially synchronous generators mainly used for power generation, remain in synchronism. The ability of synchronous generators to keep a synchronous run in an electric grid system is referred to as transient stability in a power system. Power system transient stability is a complex problem which involves many phenomena. Sometimes local measurements at one generator do not capture the complexity of system wide problems and grid faults cannot be determined by this. Monitoring and controlling system wide problems beyond monitoring and controlling separate generators can be addressed by means of Wide Area Measurement Systems (WAMS) recently developed.

The patent EP 1 805 887 B1 describes an ultracapacitor excitation booster to improve the transient stability of synchronous generators in case of grid faults. Such an excitation booster system is described below in more detail with reference to FIG. 1. However, adding excitation boosters to the generators as well as other influences at the grid, and controlling the generators by terminal voltage may deteriorate the grid system stability. It is observed that generators accelerate when a grid fault occurs. Further, is has been observed that some generator rotors accelerate with respect to a comparative value whereas other generators decelerate. Among others applying excitation booster systems to the grid system and thereby influencing the field voltage of the generator rotor might thus lead to braking the rotor speed. The braking of some generator rotors in a system of connected generators increases the speed deviation with respect to the comparative value. These speed deviations between the rotor speeds of the connected generators impair the transient stability of the whole grid system.

SUMMARY

It is an object of the invention to control the stability in an electric grid in which a plurality of generators are connected providing electric power to the grid.

This object is solved by a static exciter system according to claim 1 and by a method according to claim 7.

According to the invention the static exciter system sets the field voltage of the excitation field of the rotors of at least two generators. In particular, there are commonly connected a multitude of generators in the public electric grid beyond two generators. By this means deviations of rotor speeds of the generator rotors connected to the electric grid are decreased. Thus, the transient stability of the electric grid is increased. A dynamic excitation system is assigned to each generator for production of a DC voltage in the field winding of a generator rotor, the static exciter system is connected to the field winding and together with the field winding form an exciter circuit for emission of electrical energy in case of a grid system fault, especially a grid system voltage drop. In case of a voltage drop of the grid system the field voltage of the field winding is increased to compensate for the voltage drop. The static exciter system setting the field voltage can be applied advantageously to a plurality of generators driven by an exciter circuit connected to an electric grid. For explanation, generally an exciter system can operate controlling either filed voltage or field current. Field voltage is controlled in the so-called automatic control mode which means that the terminal voltage is regulated in a closed loop. Field current is controlled in the so-called manual control mode which means that the terminal voltage is determined by the excitation current and the machine characteristics. In this invention, the control of field voltage is regarded.

Further examples of the invention are disclosed in the independent claims.

In another example of the invention the static exciter system increases the field voltage of a generator which accelerates regarding a comparative value while the static exciter system does not increase the field voltage of a generator which decelerates regarding a comparative value. By this means deviations of generator rotor speeds are decreased, the transient stability is improved. The comparative value is set to a system specific value of the system containing several generators. The comparative value of the rotor speed is especially the center of inertia (COI) as this value indicates a status at which the system works in a stable condition. The COI value is known in the state of the art. The kinetic energy referred to the COI is responsible to pull the generators out of synchronism.

The electric quantity to be measured can be the rotational speed of the rotors of the generators, the rotation angle of the rotor of the generator, or the accelerating power of the generators. In case of disturbances in the grid system the electric quantities change. In steady-state mode the rotor angle and the rotational speed of the rotor are constant. These electric quantities depend on both the active and reactive power supplied by the generator. The generator runs stable when the change of the rotor angle and the rotational speed are constant.

BRIEF DESCRIPTION OF DRAWINGS

The invention will be explained in more detail in the following text with reference to exemplary embodiments and in conjunction with the drawing, in which.

DETAILED DESCRIPTION

Figure 1:
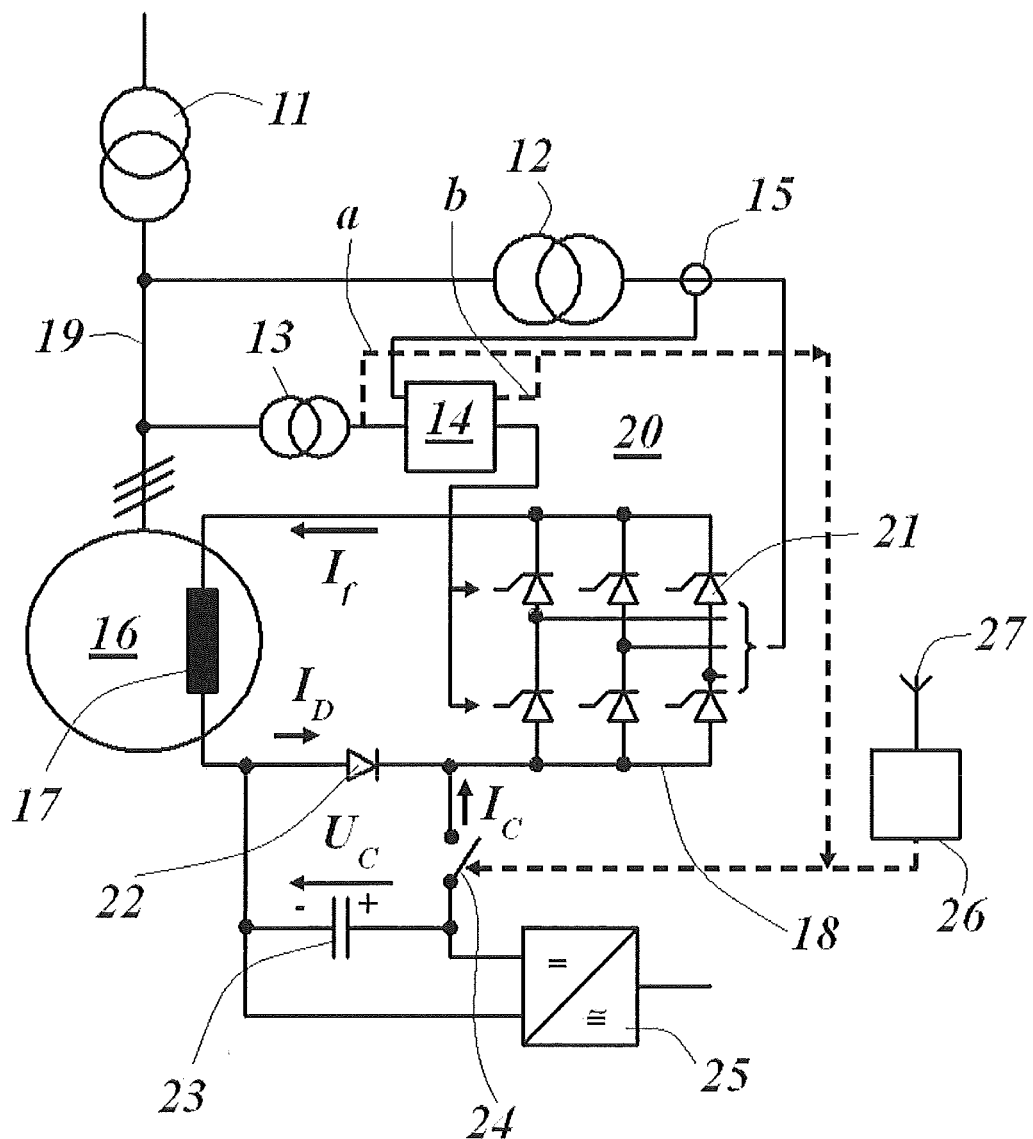
FIG. 1 shows a simplified circuit of a static exciter system according to the state of the art for applying a control device according to the invention, the static exciter system having a capacitance as an energy source, which can be connected via a switch, in the reverse-bias direction, to a diode in the exciter circuit.

FIG. 1 shows a circuit of a static exciter system 20 according to the state of the art. The control device 1 according to the invention introduced in FIG. 4 can be applied to such a static exciter system 20 by way of example. On basis of the static exciter system 20 faults in the electric grid are described which the control device 1 described below reduces. The static exciter system 20 comprises a generator 16 with a field winding 17, which is connected to a grid system 34 via a busbar 19 and a machine transformer 11. The field winding 17 is supplied with a field current $I_f$ from the static exciter system 20, which essentially includes an exciter transformer 12 followed by a thyristor bridge 18 which is fitted with thyristors 21. The thyristor bridge 18 is driven by an automatic voltage regulator (AVR) 14, which receives as input variables: on the one hand via a voltage transformer 13 the generator voltage applied to the busbar 19, and on the other hand via a current transformer 15 the current flowing in the exciter system 20. The output side of the thyristor bridge 18 is connected to the field winding 17 which form together an exciter circuit. A diode 22 is installed in the forward-bias direction in the exciter circuit. A chargeable capacitance can be connected by a switch 24 in parallel with the diode 22, with the capacitance 23 being connected in the reverse-bias direction of the diode 22. The capacitance 23 can be charged via a charging unit 25 connected to the capacitance 23. The switch 24 can be driven in various ways, as is indicated by various dashed lines in FIG. 1. During common operation, the diode 22 carries the field current $I_f$ flowing as direct current DC, and has no influence at all on the operation of the exciter circuit. The capacitance 23 which, for example, is formed from so-called ultracapacitors or supercapacitors, is held at a predetermined capacitor voltage $U_{C0}$ by the charging unit 25. The polarity of the capacitor charge corresponds to the reverse-biased direction of the diode 22. The excitation system 20 described can also be denominated as an excitation booster having the essential features of the diode 22 and the capacitance 23 connected thereto energizing the exciter circuit for a short time in case of voltage drops in the electric grid. If the terminal voltage of the generator 16 is below a lower voltage threshold, the switch 24 is switched on and the voltage of the capacitance 23 is applied to the field winding 17. Conversely, if the terminal voltage of the generator 16 is above an upper voltage threshold, the switch 24 is switched off. The field voltage is then boosted by the excitation system 20, for instance when shortages in the electric grid occur and thus the voltage drops at the generator side. When the switch 24 is closed, the capacitor voltage $U_C$ is additively connected in series with the voltage emitted from the thyristor bridge 18, thus resulting in a considerably higher field voltage $U_f$ being applied to the field winding 17. At the same time, the diode 22 becomes reverse-biased, and the diode current ID falls back to zero. The following text assumes, for simplicity reasons, a constant (frozen) control angle for the thyristor bridge 18. Owing to the increased field voltage $U_f$, the field current $I_f$ starts to rise, delayed by the inductance of the field winding 17. The switching on of the switch 24 can be triggered by the voltage at the voltage transformer 13 falling below a predetermined limit value (dashed connection (a) in FIG. 1). This makes it possible to increase the exciter supply, by means of the energy stored in the capacitance 23, when the grid-system voltage falls. While the energy is being fed into the exciter circuit, the capacitance 23 is continuously discharged, until the capacitor voltage $U_C$ is zero. The diode 22 then starts to conduct again, and the normal exciter supply remains. The method of operation of the AVR can continue unchanged. The additional capacitor feed is additionally processed via the exciter current detection, which is always present in the AVR. The desired voltage shift is achieved by precharging of the capacitance 23. The charging voltage may be up to two or more times, in particular up to three or more times, the rated value of the exciter voltage. The desired duration of the support is set via the capacitance value. The installed support time varies in the range of 1 to 20 s. As has already been mentioned above, ultracapacitors or supercapacitors, are used to form the capacitance 23 for example. Ultracapacitors such as these which, for example, have a capacitance of 2600 or 2700 F at a rated voltage of 2.5 V. By way of example, the diode 22 is installed as a disk-type diode. Failure results in an internal short circuit, which has no effect on the operation of the exciter system 20. The switch 24 can be provided with a fuse link connected in series in order to provide protection against connection to a defective diode.

Figure 2:
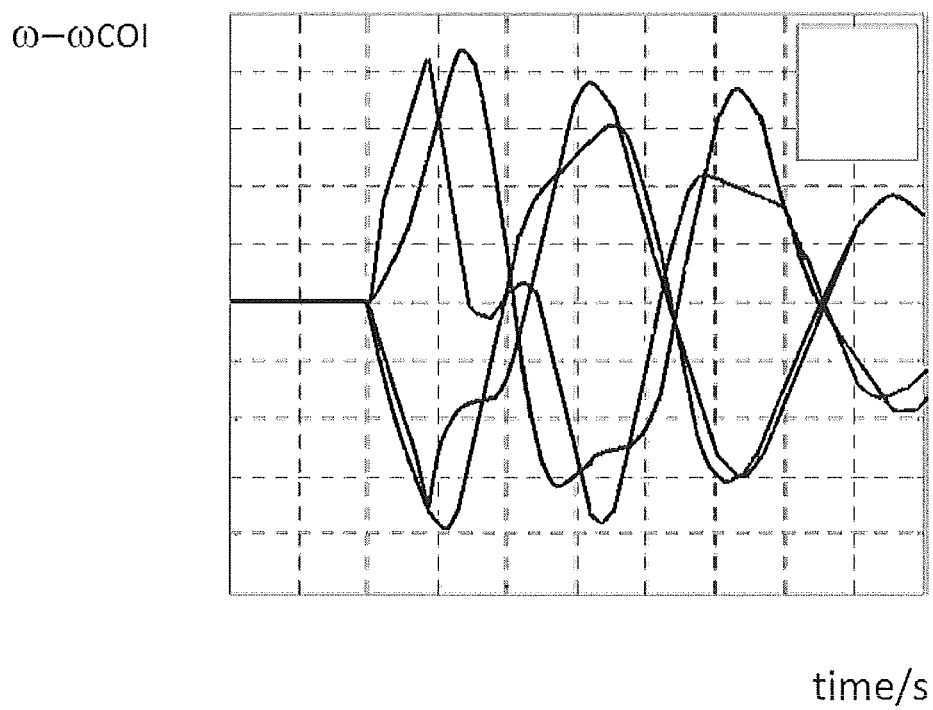
FIG. 2 shows signal curves of four generator speeds in a system of connected generators after a grid fault, with the time in seconds in the horizontal axis and the relation of the rotation speeds of the generators in the vertical axis indicating a speed deviation.

FIG. 2 shows signals of a system of four generators 16 after a grid fault by way of example, which generators 16 are connected via communication lines, commonly building a Wide Area Measurement System (WAMS) measuring quantities of the connected generators and transmitting this measured data. Shown is the time in seconds in the horizontal axis and the relation of the rotation speeds of the generators 16 in the vertical axis indicating a speed deviation. As is visible in FIG. 2 the relations of the speed deviations of the four generators 16 are up to $2.5*10^{-3}$ in this example in which no static exciter system 20 stabilizes the system of generators 16. The static exciter system 20 disclosed here reduces the speed differences between the generators 16 and therefore reduces the deviation with respect to a comparative, value. It is to be observed that two generators accelerate at certain times while the other two generators 16 decelerate whereas acceleration and deceleration alternate. As is described below the rotation speed of the rotors of the generators 16 is measured. The rotation speed can indicate a fault in the electric grid, especially when several rotation speeds are compared as is done here. Further, the rotation speed data can be used as input signals to a control device 1 as described below.

Figure 3:
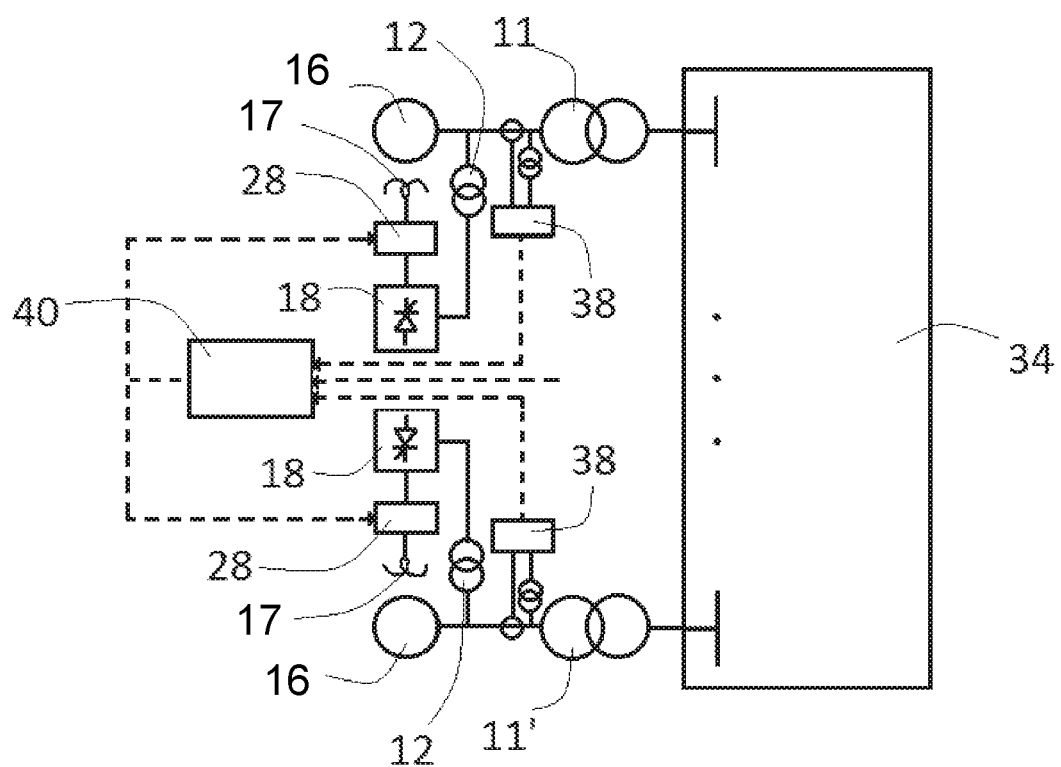
FIG. 3 shows a block diagram of an example of the invention with two schematic generators connected via data lines, a calculation unit of a comparative value, a dynamic excitation system connected to the generators, a phasor management unit feeding signals from the dynamic excitation system to the calculation unit, and a connection of these elements to an electric grid via transducers.

FIG. 3 shows a block diagram with two schematic generators connected to a dynamic excitation system 28. The generators 16 are shown in a schematic way, the dynamic excitation system 28 comprises in this example an insulated-gate bipolar transistor (IGBT) 48, a capacitance 23, and a diode 22 shown in FIG. 4. The dynamic excitation system 28 is a part of the static exciter system 20 described in detail under FIG. 1 above. The dynamic excitation system 28 is fed by the control device 1, as described in more detail under FIG. 4. The dynamic excitation system 28 is connected to a thyristor bridge 18, in FIG. 3 shown as a single block diagram. Similar to FIG. 1 each thyristor bridge 18 is connected to the electric grid via a transformer 11 or 11', respectively. Furthermore, data lines feed a calculation unit 40 from the exciter transformer 12 via a Phasor Measurement Unit (PMU) 38. The calculation unit 40 calculates a comparative value as input signal for the control device 1. In this example the calculation unit 40 thus receives signals of an electric quantity or electric quantities from two generators 16 for sake of ease, a system with a variety of generators 16 connected and feeding signals to the calculation unit 40 is applicable. The calculated comparative value characterizes a state in which the system of connected generators 16 is in a stable condition regarding the stability of the grid. The comparative value is also referred to as center of inertia (COI) of the grid. The elements described above are connected to an electric grid via machine transformers 11, 11', the generators 16 are commonly connected via electric connections to the grid, the calculation unit 40 is connected via telecommunication lines to the Wide Area Measurement System (WAMS) providing data regarding power system transient stability. This data is especially useful for controlling electric grid faults.

Figure 4:
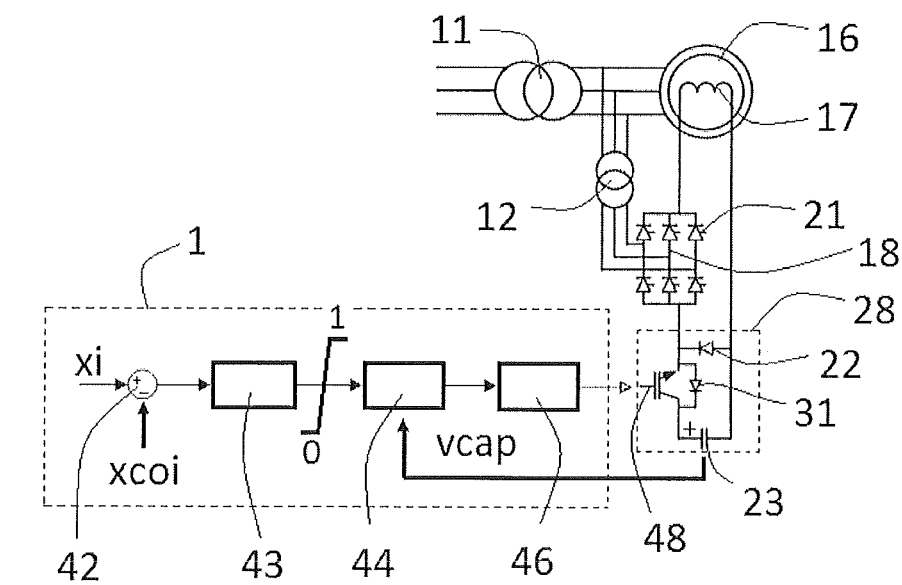
FIG. 4 shows a block diagram of an example of the invention with a control device feeding a signal via a Wide Area Measurement System (WAMS) to a dynamic excitation system connected to a synchronous generator connected to a grid.

FIG. 4 shows a block diagram of an example of the invention with a control device 1 feeding a signal via a Wide Area Measurement System (WAMS). The control device 1 is hereby distant to most of the generators 16 connected to the WAMS and receives and transmits signals from and to the WAMS, respectively. The input signal $x_i$ to the control device 1 is a signal derived from the generator terminal voltage and current of a generator 16 connected to the WAMS at which the control device 1 is connected. The busbar 19 shown in FIG. 1 forms part of the WAMS. The second input signal $x_{COI}$ to the control device 1 comes from the calculation unit 40 fed by the Phasor Measurement Units (PMU) 38 and is added to the signal $x_i$ at an adding element 42. The PMU 38 is a measurement device that provides voltage phase angle measurements synchronized to a common time reference. The signal $x_{COI}$ takes into account the different contributions of each synchronous generator 16 to the transient stability of the overall power system commonly comprising several generators 16. In an alternative example the signals fed to the adding element 42 are signals indicating a speed deviation. The first signal is in this alternative a speed deviation of a rotor generator, the second signal is a speed deviation of a comparative value derived from the speed of the variety of generators 16 connected. The signal from the adding element 42 is fed to a controller 43 in which a decision is done whether to drive the dynamic exciter system 28. After the controller 43 a Pulse Width Modulator (PWM) 44 is connected receiving a signal $v_{cap}$ also from the dynamic exciter system 28. The output of the PWM 44 is connected to a driver 46 which drives the dynamic exciter system 28. The dynamic exciter system 28 in this example comprises a diode 22 connected in parallel to a capacitance 23 with an IGBT as a switch 24 having a freewheeling diode 31 connected between collector and emitter of the IGBT. The voltage stored in the capacitance 23 is added to the field winding 17 when a fault occurs. Similar to the configuration of FIG. 3 a thyristor bridge 18, here consisting of six thyristors, are connected to the emitter side of the IGBT. The output of the thyristor bridge 18 is connected to the synchronous generator field winding 17, as is described under FIG. 1, which generator 16 is also connected to the dynamic exciter system 28. These connections are basis of the field voltage of the connected generator 16. The thyristor bridge 18 has further three outputs according to the three current phases connected to the grid via an exciter transformer 12. The control device 1 modulates the voltage of the capacitance 23, in this example an ultracapacitor, by means of commuting the transistor circuit 48 of FIG. 4, which is similar to the solid state switch 24 of the static exciter system 20 of FIG. 1. The field voltage of each of the connected generators 16 can be increased if necessary. This might be necessary when the reduction of the terminal voltage of a generator 16 due to faults results in a reduction of the field voltage and, therefore in a reduction of the electromagnetic torque applied by the machine to the rotor of the certain generator 16. Meanwhile, as the mechanical torque from the turbine connected to the generator 16 remains almost constant, the rotor accelerates. The phenomena of accelerating and decelerating generator rotors is described under FIG. 2. In the example described the field voltage of connected generators 16 equipped with a static exciter system 20 comprising a dynamic excitation system 28, also referred to as booster, is increased. The control device 1 increases the field voltage of the generators 16 that are accelerating with respect to a comparative value whereas the control device 1 does not supply additional voltage to the generators 16 decelerating with respect to the comparative value. The effect from this is that the transient stability of the system comprised mainly by a multitude of generators 16 is improved. The control device 1 is directed to reduce the speed deviations compared to a comparative value for each generator 16. Hereby, only speed deviations responsible for pulling the system from several generators 16 out of synchronism are reduced which are proportional to the transient kinetic energy. Therefore, the control device 1 contributes to the stability of the generator system by taking into account the stability situation of the generator system provided with data from remote measurements by busbars 19.

The described static exciter system 20 ensures the continuity and quality of electricity supply. Any type of failure in the grid does not lead to a loss of transient stability of the connected generators 16. The ability of the generator 16 to remain connected to the grid in case of an external fault is improved. The requirement is especially useful in connection with grid codes defining official requirements for grid requirements. Further, the static exciter system disclosed here has demonstrated to improve the critical clearing time after a severe disturbance in the system of generators 16.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:
1. A system comprising:
   a control device for controlling respective field voltages of field windings of at least two generators connected to a grid system via a busbar, for measuring an electric quantity of the at least two generators; and
   a static exciter system, wherein the control device drives the static exciter system which is assigned to each generator for production of a DC voltage in the field winding of a generator rotor, the static exciter system being connected to the field winding and together with the field winding forming an exciter circuit for emission of electrical energy by increasing the field voltage of the field winding in case of a grid system fault or grid system voltage drop;

wherein the grid system and the busbar are part of a wide area measurement system; and wherein the system further comprises a calculation unit that feeds signals to the control device, and wherein the control device is configured to increase the field voltages of one or more of the at least two generators which accelerate with respect to a comparative value calculated by the calculation unit and the control device is configured to not increase the field voltages of others of the at least two generators which decelerate with respect to the comparative value calculated by the calculation unit.

2. The system of claim 1, wherein the static exciter system includes a respective dynamic excitation system in association with each of the at least two generators, the dynamic excitation system comprising a transistor, a capacitance, and a diode, wherein the dynamic excitation system is driven by the control device and is connected to the field winding of its respective generator by a thyristor bridge.

3. A system comprising:
a control device for controlling respective field voltages of field windings of at least two generators connected to a grid system via a busbar, for measuring an electric quantity of the at least two generators; and
a static exciter system, wherein the control device drives the static exciter system which is assigned to each generator for production of a DC voltage in the field winding of a generator rotor, the static exciter system being connected to the field winding and together with the field winding forming an exciter circuit for emission of electrical energy by increasing the field voltage of the field winding in case of a grid system fault or grid system voltage drop, wherein a first input signal to the control device comprises the field voltage of a single one of the at least two generators and a second input signal to the control device comprises a comparative value derived from the voltages of all the at least two generators connected.

4. The system of claim 3, wherein the static exciter system includes a respective dynamic excitation system in association with each of the at least two generators, the dynamic excitation system comprising a transistor, a capacitance, and a diode, wherein the dynamic excitation system is driven by the control device and is connected to the field winding of its respective generator by a thyristor bridge.

5. The system of claim 4, wherein the grid system and the busbar are part of a wide area measurement system.

6. The system of claim 3, wherein the grid system and the busbar are part of a wide area measurement system.

7. A system comprising:
a control device for controlling respective field voltages of field windings of at least two generators connected to a grid system via a busbar, for measuring an electric quantity of the at least two generators; and
a static exciter system, wherein the control device drives the static exciter system which is assigned to each generator for production of a DC voltage in the field winding of a generator rotor, the static exciter system being connected to the field winding and together with the field winding forming an exciter circuit for emission of electrical energy by increasing the field voltage of the field winding in case of a grid system fault or grid system voltage drop, wherein a first input signal to the control device comprises a speed deviation of a single generator of the at least two generators and a second input signal to the control device comprises a comparative value derived from speed deviations of the at least two generators connected.

8. The system of claim 7, wherein the static exciter system includes a respective dynamic excitation system in association with each of the at least two generators, the dynamic excitation system comprising a transistor, a capacitance, and a diode, wherein the dynamic excitation system is driven by the control device and is connected to the field winding of its respective generator by a thyristor bridge.

9. The system of claim 8, wherein the grid system and the busbar are part of a wide area measurement system.

10. The system of claim 7, wherein the grid system and the busbar are part of a wide area measurement system.

* * * * *